(12) United States Patent
Chen

(10) Patent No.: US 11,354,788 B1
(45) Date of Patent: Jun. 7, 2022

(54) OVERLAPPED CURVE MAPPING FOR HISTOGRAM-BASED LOCAL TONE AND LOCAL CONTRAST

(71) Applicant: Advanced Micro Devices, Inc., Santa Clara, CA (US)

(72) Inventor: Ying-Ru Chen, Toufen (TW)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/114,480

(22) Filed: Dec. 7, 2020

(51) Int. Cl.
*G06T 5/00* (2006.01)
*G09G 5/02* (2006.01)
*G06T 5/40* (2006.01)

(52) U.S. Cl.
CPC .............. *G06T 5/008* (2013.01); *G06T 5/40* (2013.01); *G09G 5/026* (2013.01); *G09G 2320/0242* (2013.01); *G09G 2320/066* (2013.01)

(58) Field of Classification Search
CPC ........... G06T 5/008; G06T 5/40; G09G 5/026; G09G 2320/0242; G09G 2320/066
See application file for complete search history.

(56) References Cited

U.S. PATENT DOCUMENTS

| | | | |
|---|---|---|---|
| 2007/0092136 A1* | 4/2007 | Zhao | G06T 5/40 382/169 |
| 2008/0088857 A1* | 4/2008 | Zimmer | H04N 1/56 358/1.6 |
| 2015/0296193 A1* | 10/2015 | Cote | H04N 9/646 382/167 |
| 2017/0061236 A1* | 3/2017 | Pope | G06K 9/4671 |
| 2020/0219238 A1* | 7/2020 | Peng | G06T 5/007 |

* cited by examiner

*Primary Examiner* — David T Welch
(74) *Attorney, Agent, or Firm* — Volpe Koenig

(57) ABSTRACT

Methods and apparatuses are disclosed herein for performing tone mapping and/or contrast enhancement. In some examples, a block mapping curve is low-pass filtered with block mapping curves of surrounding blocks to form a smoothed block mapping curve. In some examples, overlapped curve mapping of block mapping curves, including smoothed block mapping curves, is performed, including weighting, based on a pixel location, block mapping curves of a group of blocks to generate an interpolated block mapping curve and applying the interpolated block mapping curve to a pixel to perform ton mapping and/or contrast enhancement.

18 Claims, 8 Drawing Sheets

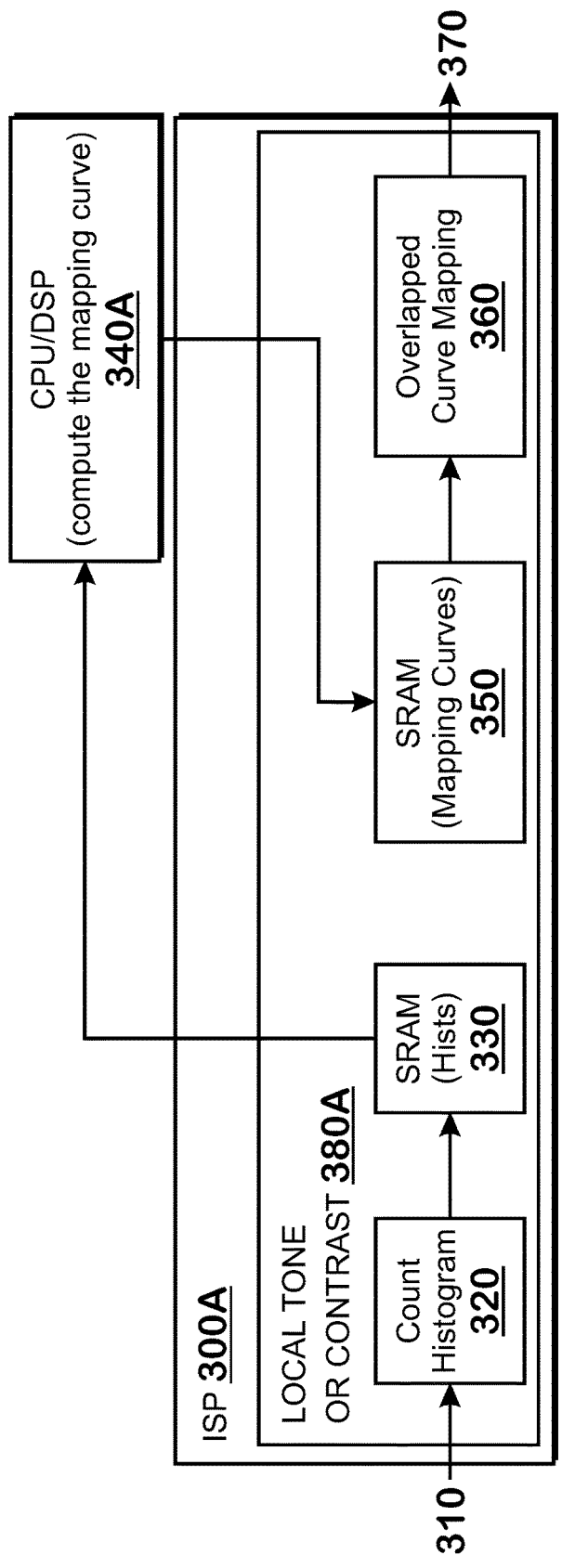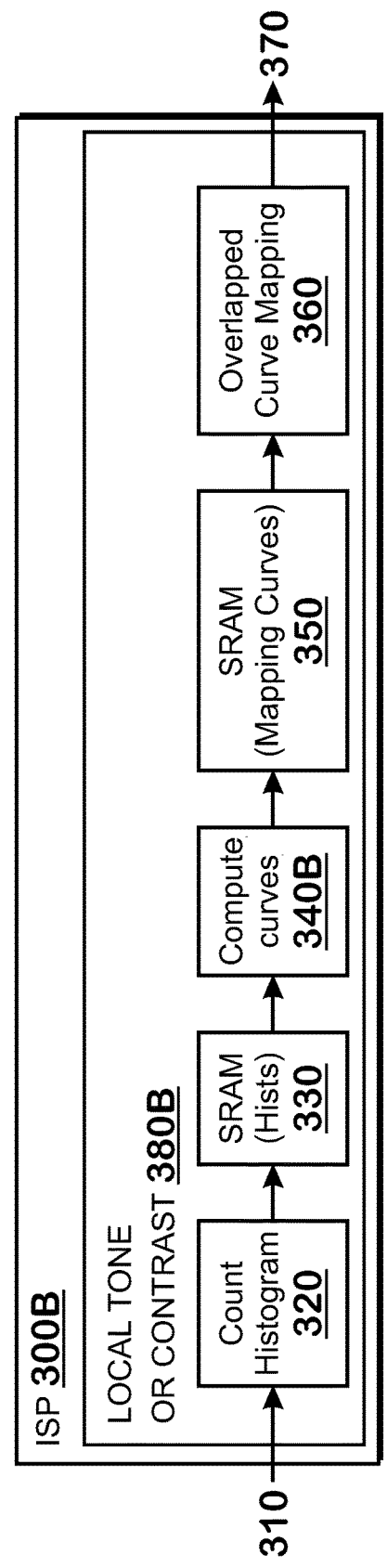
FIG. 3A
FIG. 3B

OVERLAPPED CURVE MAPPING FOR HISTOGRAM-BASED LOCAL TONE AND LOCAL CONTRAST

BACKGROUND

End users often prefer more contrast in both dark and bright regions of an image. To improve contrast, traditionally histogram equalization has been used. Histograms, which track counts of the intensity of pixels in an image, can be adjusted such that the tracked intensities are more widely distributed across the full range of intensities from the darkest values to the brightest values. In an image with both dark and bright regions that, before adjustment, include pixel intensities near the darkest and brightest extremes, global contrast techniques are limited in the ability to improve contrast.

To address the limits of global histogram equalization techniques, local histogram equalization has been used. In this case, histograms for a local block of pixels are equalized such that, for example, a dark region may be isolated in a block and thus the intensities are all restricted to a smaller range. Applying histogram equalization to these intensities, the darker intensities can be more significantly adjusted to locally improve the contrast in the block. Similarly, through local histogram equalization, a bright region can be adjusted to improve the contrast locally by spreading out the brightness values of the pixels to darken some of the pixels. However, this technique often results in halo effects and/or blocky artifacts from one block to the next that are undesirable to the end user. These negative effects are due to significantly different tone and/or contrast mapping curves for each block derived from the equalized block histograms.

Techniques are disclosed herein that locally improve contrast without the negative effects of existing techniques.

BRIEF DESCRIPTION OF THE DRAWINGS

A more detailed understanding can be had from the following description, given by way of example in conjunction with the accompanying drawings wherein:

FIG. 3A is a block diagram depicting an example implementation of an image signal processor (ISP);

FIG. 3B is a block diagram depicting another example implementation of an ISP;

DETAILED DESCRIPTION

Figure 1:
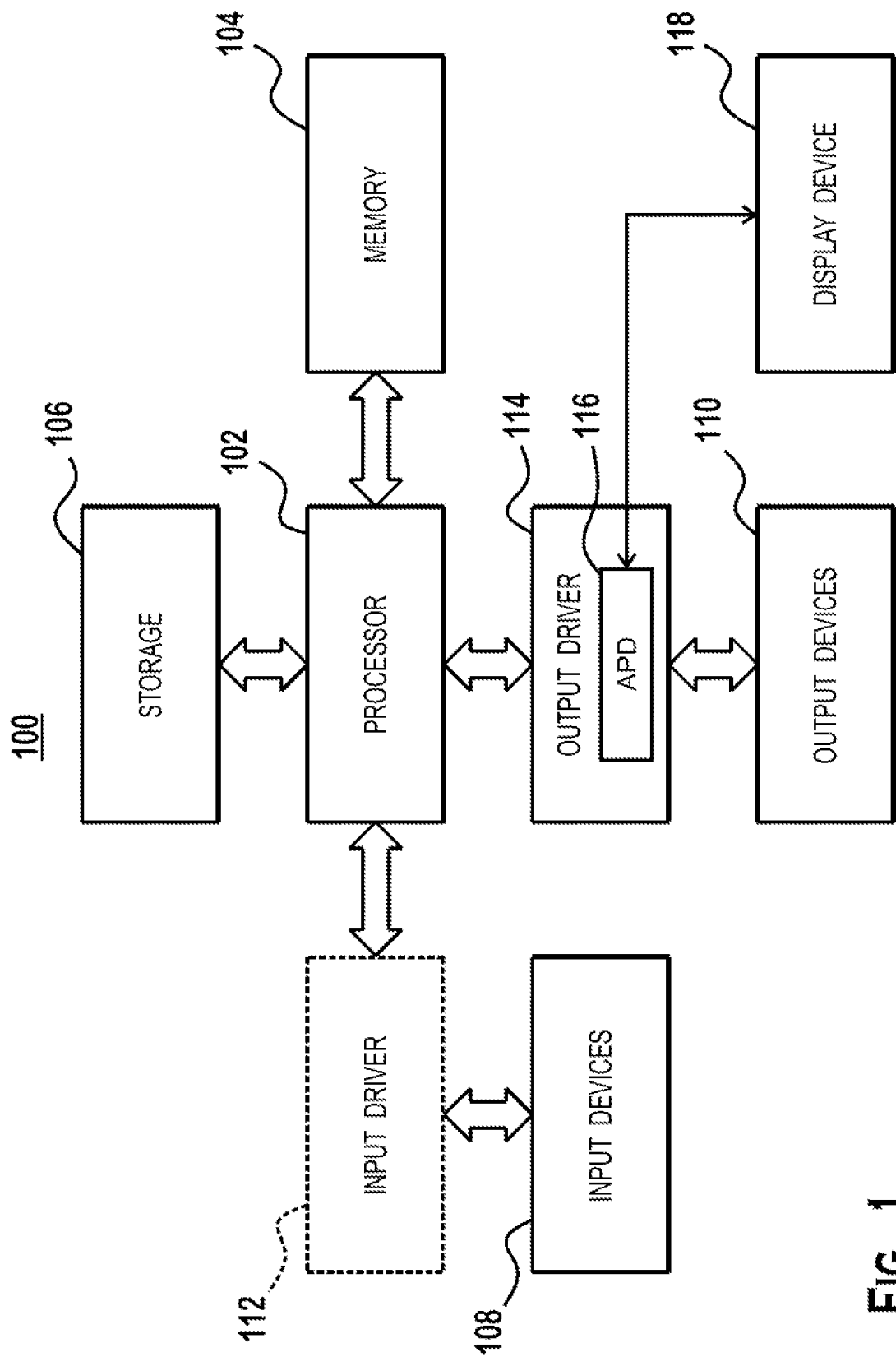
FIG. 1 is a block diagram of an example device in which one or more features of the disclosure can be implemented.

Examples of image processing techniques are disclosed herein that enhance local contrast and/or provide tone mapping without negative effects exhibited by conventional techniques. In some implementations, a block-based mapping curve for a particular block is spatially low-passed with block-based mapping curves of corresponding surrounding blocks. In some implementations, overlapped curve mapping is further applied to smooth a mapping curve applied to a selected pixel based on mapping curves of neighboring blocks and a position of the selected pixel relative to the neighboring blocks. As used herein, a block mapping curve or block-based mapping curve includes a single curve per block that is used to map all pixels within said block from an input value to an output value.

Disclosed herein are image signal processing methods, computer systems, and non-transitory computer readable storage media for performing overlapped curve mapping for histogram-based local tone and local contrast. Some examples include dividing at least a portion of an input image into a plurality of pixel blocks. Some examples further include generating a first block mapping curve for each block of the plurality of blocks. Some examples further include determining, from the plurality of blocks pixels, a set of overlap blocks based on the pixel location. Some examples further include generating a new pixel value for the input pixel based on a combination of the first block mapping curves for each overlap block of the set of overlap blocks and the pixel location.

Some examples further include applying the respective first block mapping curve of each overlap block of the set of overlap blocks to the input pixel value to determine a respective intermediate pixel value.

Some examples further include generating the new pixel value using a bilinear interpolation output that is based on the intermediate pixel values and distances based on relative positions of the input pixel and each of the overlap blocks.

In some examples, a first block mapping curve of a first overlap block with a center that is relatively closer to the input pixel than a second overlap block of the set of overlap blocks contributes relatively more to the new pixel value than a first block mapping curve of the second overlap block.

Some examples further include scaling a red channel value, a green channel value, and a blue channel value of the input pixel value to generate the new pixel value using a ratio of the bilinear interpolation output to the input pixel value.

Some examples further include generating the first block mapping curve of a first block of the plurality of blocks based on a weighted average of an initial block mapping curve of the first block and respective initial block mapping curves of surrounding blocks, wherein the weighted average is based on a low-pass filtering operation.

Some examples further include sending the new pixel value to a memory device and storing the new pixel value on a storage device. Additionally or alternatively, in some examples, the new pixel value is sent to a display device and a pixel corresponding to the new pixel value is displayed on the display device.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
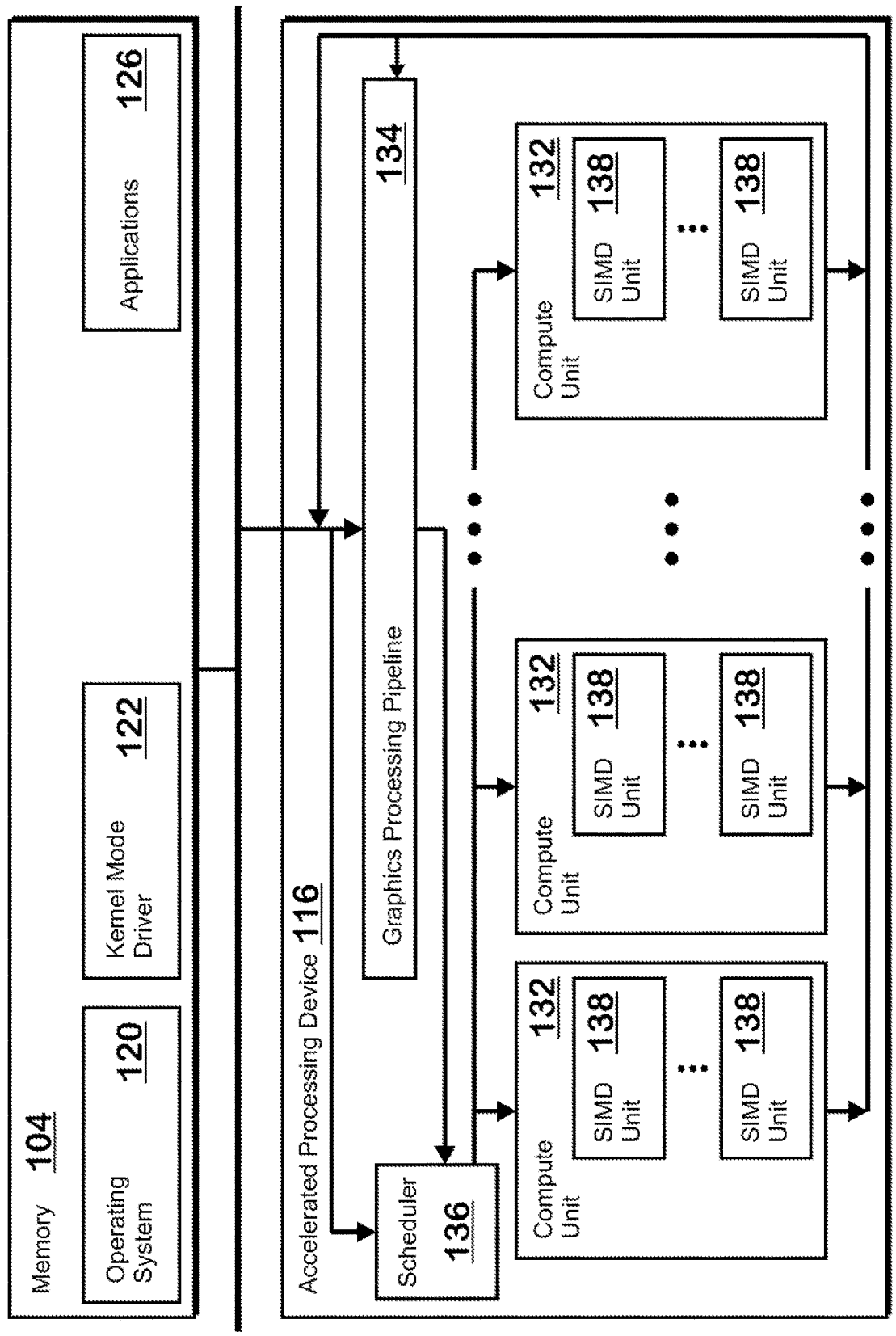
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

FIGS. 3A and 3B are block diagrams depicting example implementations of an image signal processor (ISP) 300A and 300B, respectively, configured to perform local contrast and/or tone mapping. In some examples, the ISP 300A and/or 300B is an input device such as one of input devices 108 within example device 100 or as an APD 116 in FIGS. 1 and 2. In some examples, CPU/DSP 340A is processor 102 in FIG. 1 or APD 116 in FIGS. 1 and 2. The ISPs 300A and 300B include local tone or contrast circuitry 380A and 380B, respectively. ISPs 300A and 300B and the components depicted therein can be implemented as hardware or a combination of hardware and software.

The local tone or contrast circuitry 380 receives an input 310. In some examples, input 310 is an image that includes a plurality of blocks or it may be a single block of an image. Circuitry 320 counts pixel data to generate a histogram for each received block. Alternatively, a histogram may be generated for a group of blocks. Static Random Access Memory (SRAM) or other suitable storage 330 stores the one or more histograms. In FIG. 3A, an external CPU, DSP, or any other suitable execution unit 340A computes a mapping curve for each block histogram. In some examples, circuitry 340B within the local tone or contrast circuitry 380 in FIG. 3B computes mapping curves. Additionally or alternatively, a mapping curve may be computed for a group of block histograms. Additionally or alternatively, a block histogram corresponding to a selected block may be combined with block histograms of other blocks, such as via a weighted average or low-pass filter operation, as will be explained in further detail below. In some examples, CPU/DSP 340A as shown in FIG. 3A or circuitry 340B as shown in FIG. 3B combines block histograms or may receive combined block histograms from SRAM 330. In some examples, the mapping curves output from CPU/DSP 340A in FIG. 3A or circuitry 340B shown in FIG. 3B are stored in SRAM or other suitable storage 350. SRAM 330 and SRAM 350 may be the same or may be different. Circuitry 360 performs overlapped curve mapping, as will be explained in further detail below, to generate output 370. Output 370 may be an image, a pixel value, a block of pixel values, a plurality of blocks of pixel values, or other output value that can be used to adjust a pixel to alter contrast or tone. In one example, a scaling ratio is output that is used to scale a luminance of a pixel, a red channel, a blue channel, a green channel of a pixel, or any combination thereof. In some examples, output 370 is sent to display device 118 to display an image. In some examples, the output 370 is sent to display device 118 during a preview mode of the device 100. Additionally or alternatively, output 370 is sent to memory 104. Additionally or alternatively, output 370 is sent to storage 106. In some examples, the output 370 is sent to memory 104 before being sent to storage 106. In some examples, device 100 sends output 370 to memory 104 and/or storage 106 during an image capture or video recording mode. In some examples, the output 370 is the result of compressed image, for example Joint Photographic Experts Group (JPEG), or other compressed video, for example Motion Picture Expert Group (MPEG), processing.

Figure 4:
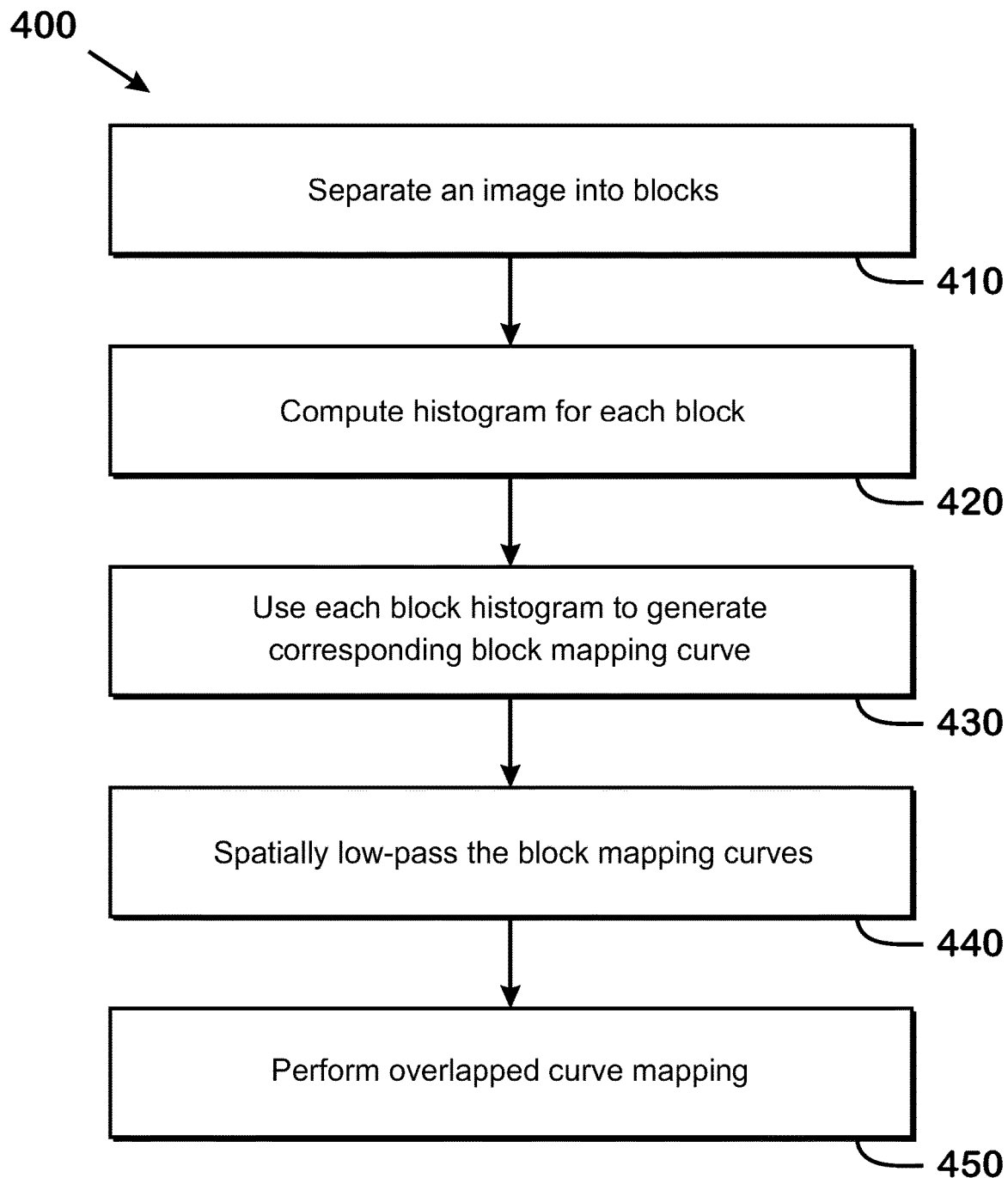
FIG. 4 is a flow diagram depicting an example method of local tone and/or contrast mapping.

FIG. 4 is a flow diagram depicting an example method 400 of local tone and/or contrast mapping. At 410, an image is separated into a plurality of blocks of pixels. At 420, a histogram is computed for each block of the plurality of blocks of pixels. At 430, the histogram for each block is used to generate a corresponding block mapping curve for each block. At 440, the block mapping curve for each block is spatially low-pass filtered with one or more block mapping curves corresponding to surrounding one or more blocks. At 450, overlapped curve mapping is performed per pixel to adjust tone and/or contrast.

Figure 5:
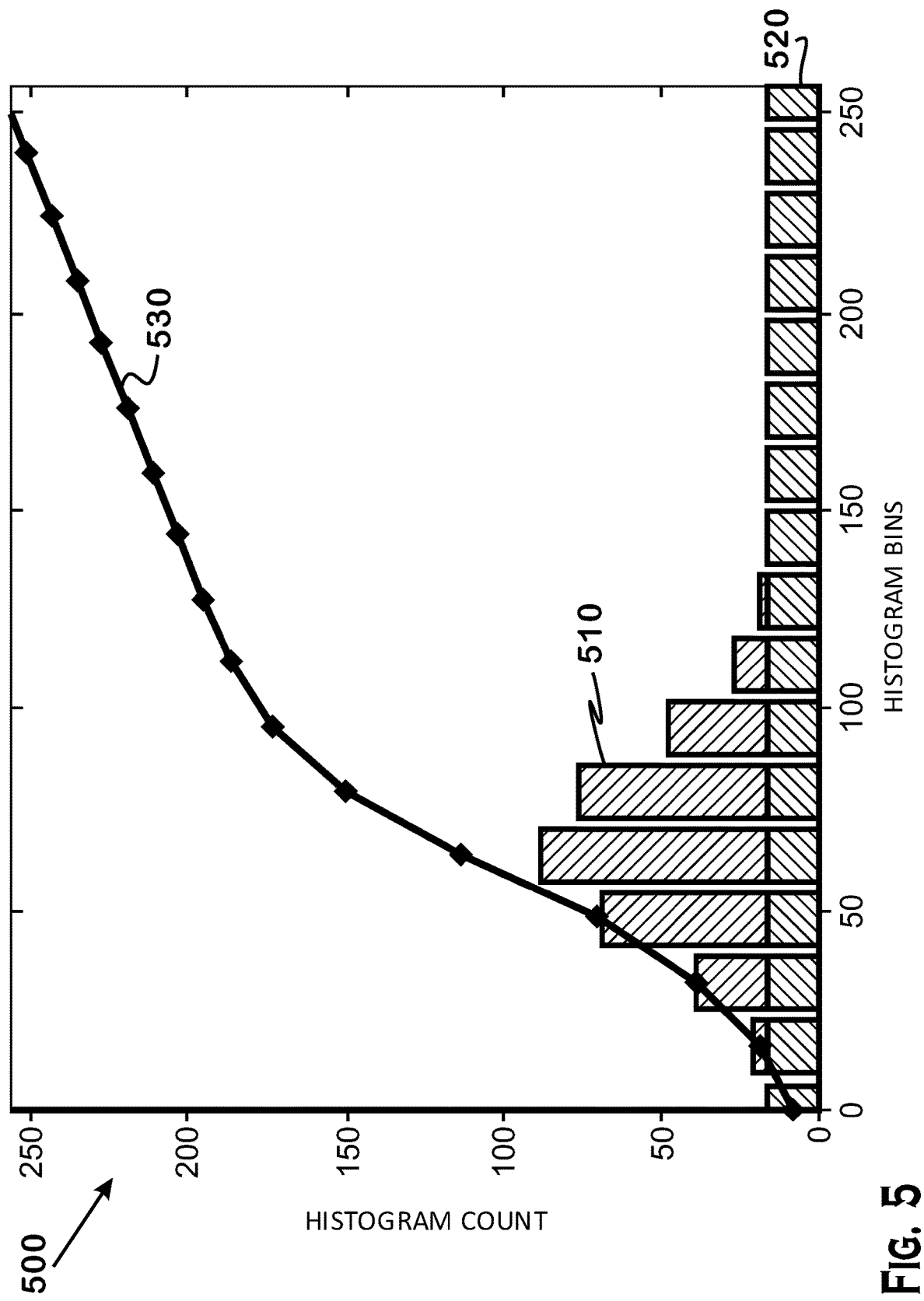
FIG. 5 is a diagram that depicts an example block histogram and block mapping curve.

FIG. 5 is a diagram 500 that depicts an example block histogram 510 for a block of pixels, a base term 520 added across all bins, and a corresponding block mapping curve 530 for the block of pixels. The values represented by the histogram count and histogram bins are examples and are not limiting. In this example, the input values are 8-bits corresponding to values of 0 to 255. In some examples, the input values can be a pixel's luminance value, red channel value, green channel value, blue channel value, maximum value of the red, blue, or green (RGB) channel values, or any combination thereof. A maximum value of (RGB), or max (RGB), is the value of the three channels that has the largest value. For example, if R=120, G=190, and B=200, max (RGB)=200. As in the example depicted in FIG. 5, the inputs may be grouped into 17 bins with corresponding ranges of input values. The histogram count corresponding to block histogram 510 represents the number of pixels in the block of pixels that fall into the respective bin's range of values. Base term 520 is a tunable factor that can be added to the bins to adjust contrast for the block. A larger base term 520 results in less contrast for the block of pixels and a smaller base term 520 results in more contrast for the block of pixels. In some examples, block mapping curve 530 is a normalized accumulation of the histogram counts including the original block histogram 510 and the base term 520.

As described above, the block histogram 510 and corresponding block mapping curve 530 can correspond to RGB channel values of pixels, a max(RGB) of pixels, luminance (Y) of pixels, or any combination thereof. In some examples, luminance of pixels is used for tone and/or contrast mapping because the human eye receives the most information from luminance. However, mapping luminance for contrast enhancement, for example, can cause color shift. In one example, luminance is a function of R, G, and B:

$$Y=0.299R+0.587G+0.144B \quad (1)$$

For a pixel with a large B value, when performing contrast enhancement based on luminance, color shift occurs due to a saturation of the B value. For example, for a pixel with (R, G, B)=(20, 20, 200), using equation (1), Y=40.52. Scaling luminance to a maximum value of 255 for contrast enhancement results in scaling factor of F=255/Y=255/40.52=6.29. The contrast enhanced new pixel RGB values are then scaled by F, such that (R, G, B)=(20×6.29, 20×6.29, 200× 6.29)=(125.8, 125.8, 1258). For 8-bit values, the B value is truncated to a maximum value of 255 which causes a color shift for the pixel.

As an alternative to using luminance counts for contrast enhancement as described above, counting of maximum of RGB prevents color shift. For the same pixel (R, G, B)=(20, 20, 200), when using max(RGB), where in this example max(RGB)=200, the scaling factor is now F=255/ 200=1.275. Now, the contrast enhanced new pixel RGB values are, (R, G, B)=(20×1.275, 20×1.275, 200×1.275)=

(25.5, 25.5, 255) which has no color shift compared to the original pixel values. Thus, the block mapping curve 530 can be based on the max(RGB) values for each pixel in the block of pixels and can map an input pixel's RGB values to output RGB values without color shifting. In some examples, the block mapping curve 530 can be implemented as a look-up table of input values and output values.

In another alternative, because the human eye receives the most information from luminance, but because tone and/or contrast mapping based on luminance can lead to color shifting problems, a combination of luminance and max (RGB) can be counted in the block histogram 510 and corresponding block mapping curve 530. For example, to perform tone and/or contrast mapping based on a blend of luminance and max(RGB), a histogram of values: $P=\alpha*Y+ (1-\alpha)*max(RGB)$ may be used. In one example, $\alpha$ is 1/4 and $(1-\alpha)$ is 3/4. The ratios of ¼ and 3/4 are merely examples and any ratio may be used to blend a combination of luminance and max(RGB). In some examples, it is preferable that $\alpha$ is less than 1/4 such that a larger ratio of max(RGB) is used compared to that of luminance. Further, the function for P is an example of a linear combination of Y and max(RGB). Other linear or non-linear functions that take the same or other inputs are possible as well.

In some examples, spatial low-pass filtering a block mapping curve, such as 440 depicted in FIG. 4, includes determining a new block mapping curve for a corresponding block based on, in addition to the original block mapping curve generated, for example, in 430 in FIG. 4, the original block mapping curves corresponding to a selection of surrounding neighbor blocks. By spatial low-pass filtering a block's mapping curve with other surrounding block mapping curves, a difference between the block mapping curves from block-to-block may be lessened such that a transition between the block mapping curves is smoothed so that a blockiness effect between the blocks is reduced. In some examples, a spatial low-pass filter is implemented as a weighted average of a group of block mapping curves.

As a 1-dimensional example, consider a block mapping curve for a center block that has output values {20, 35, 54, 72, . . . } defining the shape of the block mapping curve for the center block, wherein the positions of the output values in the series indicate a corresponding input bin. In this example, a left block located to the left of the center block has example values of {16, 32, 48, 64, . . . } defining the shape of its block mapping curve, and a right block located to the right of the center block has example values of {22, 36, 52, 70, . . . } defining the shape of its block mapping curve. An example 1-dimensional filter defined as Int 1D_Curve_LP[3]={1, 2, 1} can be used to weight the curves such that a low-pass filtered version of a block mapping curve for the center block results that is based on the three block mapping curves. In this example, the 1-dimensional filter curve weights the left block with a value of 1, the center block with a value of 2, and the right block with a value of 1. Multiplying the filter across the three block mapping curves low-pass filters the curves and results in a filtered block mapping curve for the center block of:

$$\left\{\frac{1\times16+2\times20+1\times22}{4}, \frac{1\times32+2\times35+1\times36}{4}, \frac{1\times48+2\times54+1\times52}{4}, \frac{1\times64+2\times72+1\times70}{4} \ldots\right\}.$$

Here, the values are divided by 4 to normalize for the filter coefficients, such that each value is divided by the sum of the filter coefficients. In some examples, this is low-pass filtering operation is an implementation of a weighted average.

In a 2-dimensional example, a 2-dimensional filter can be defined, such as:

$$Int\,2D\_Curve\_LP[7][7] = \left\{\begin{pmatrix} 1 & 1 & 1 & 1 & 1 & 1 & 1 \\ 1 & 1 & 1 & 2 & 1 & 1 & 1 \\ 1 & 1 & 2 & 2 & 2 & 1 & 1 \\ 1 & 2 & 2 & 4 & 2 & 2 & 1 \\ 1 & 1 & 2 & 2 & 2 & 1 & 1 \\ 1 & 1 & 1 & 2 & 1 & 1 & 1 \\ 1 & 1 & 1 & 1 & 1 & 1 & 1 \end{pmatrix}\right\}.$$

Here, a low-pass filtered output block mapping curve is generated for a center block of a 7×7 collection of blocks that are taken as input. For the center block corresponding to the center entry of the 2D_Curve_LP matrix, which has a weight of 4, a square-shaped group of blocks that extends 3 blocks to the left, 3 blocks to the right, 3 blocks above, and 3 blocks below the center block are weighted by the 2D_Curve_LP matrix to generate a low-pass filtered output block mapping curve for the center block that is based on all of the blocks in the square-shaped group of blocks. Here, the output values are divided by 64 to normalize for the sum of the filter coefficients.

The values shown above are not meant to be limiting. Although the above example filters are represented by integer values, any values can be used. Further, although the above example depicts a weighted average of the input block mapping curves used for each value of the output block mapping curve, the output block mapping curve may be any suitable function of an input block mapping curve and the block mapping curves of surrounding blocks. Additionally, in the example of the 2D_Curve_LP filter coefficients provided above, a 7×7 selection of blocks was used. The selection does not have to be square, and further the selected quantity of blocks can be smaller or larger. For example, a 5×5, a 7×9, etc. sized filter can be used.

Figure 6:
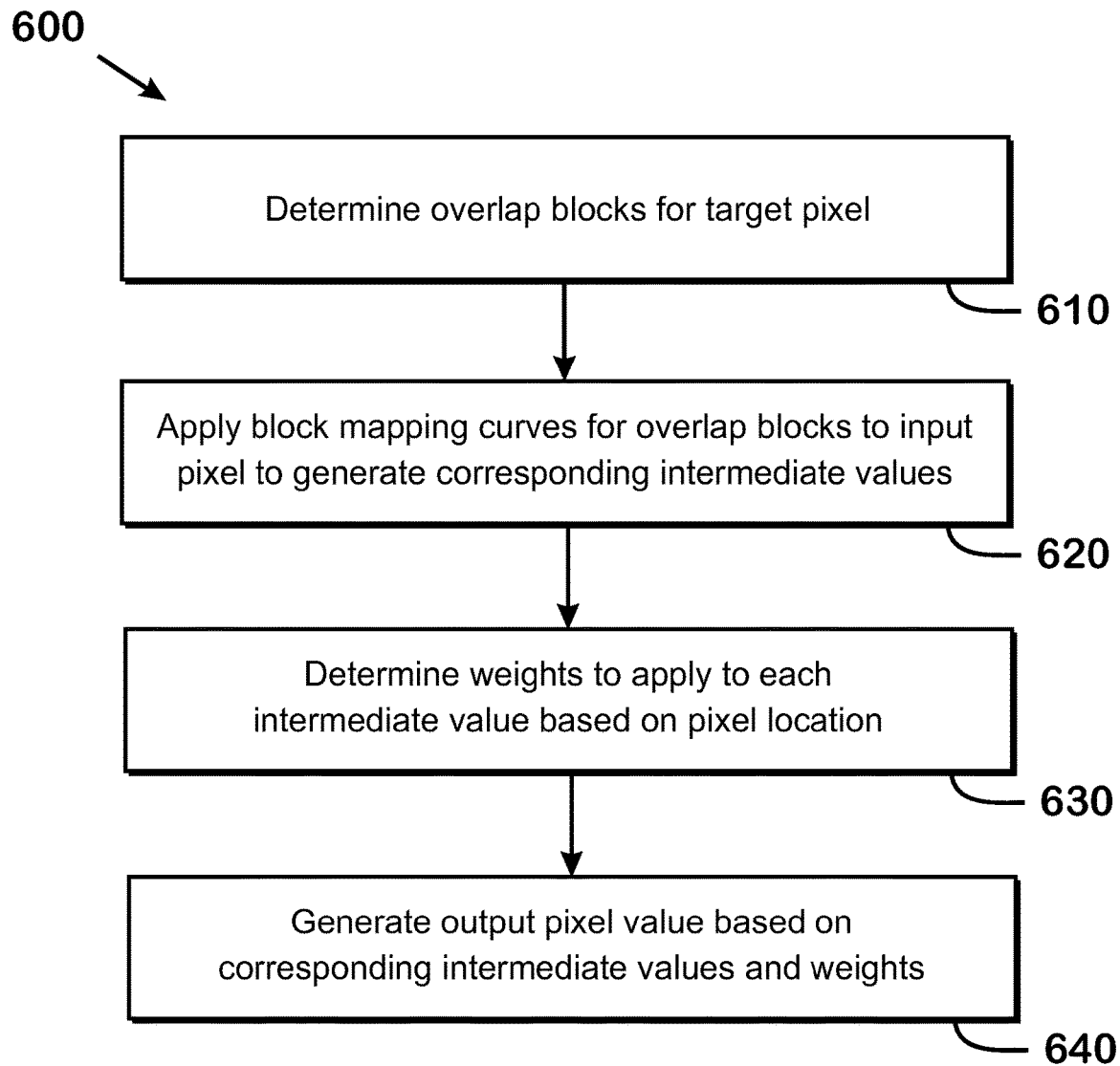
FIG. 6 is a flow diagram depicting an example method for performing overlapped curve mapping.
Figure 7A:
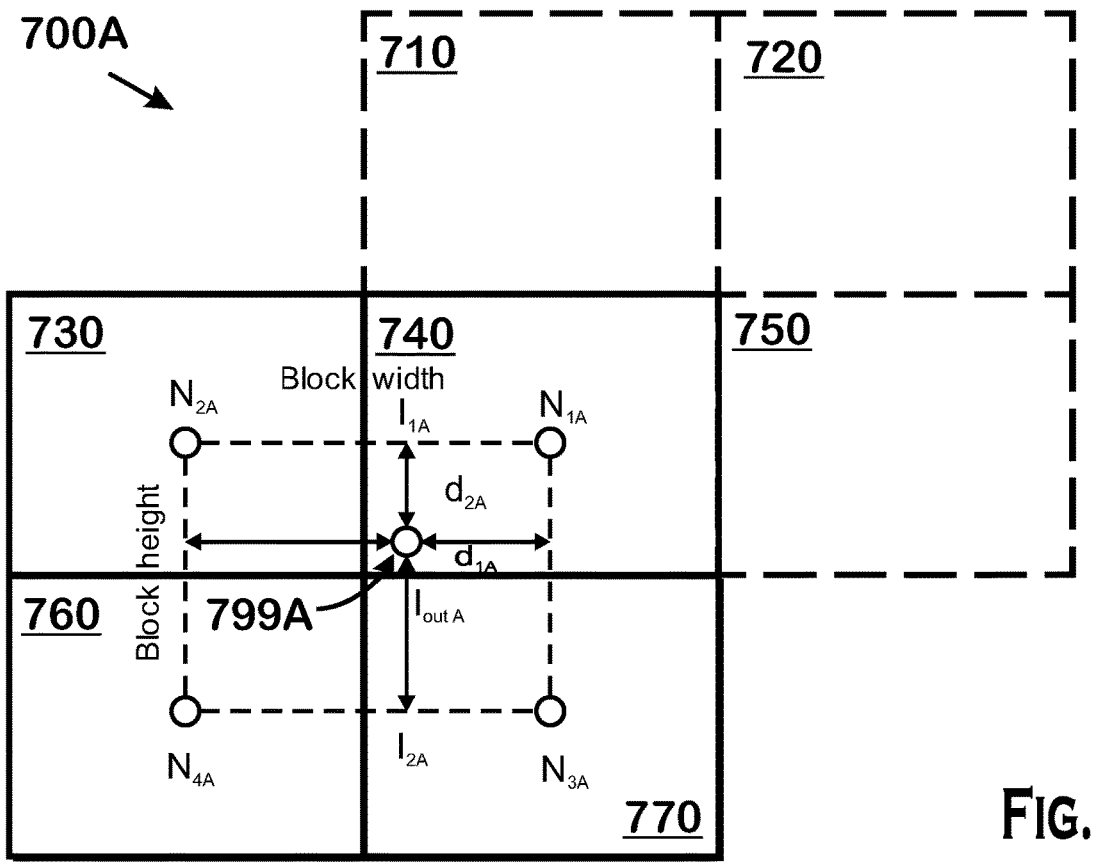
FIG. 7A is a diagram depicting an example of overlapped curve mapping.
Figure 7B:
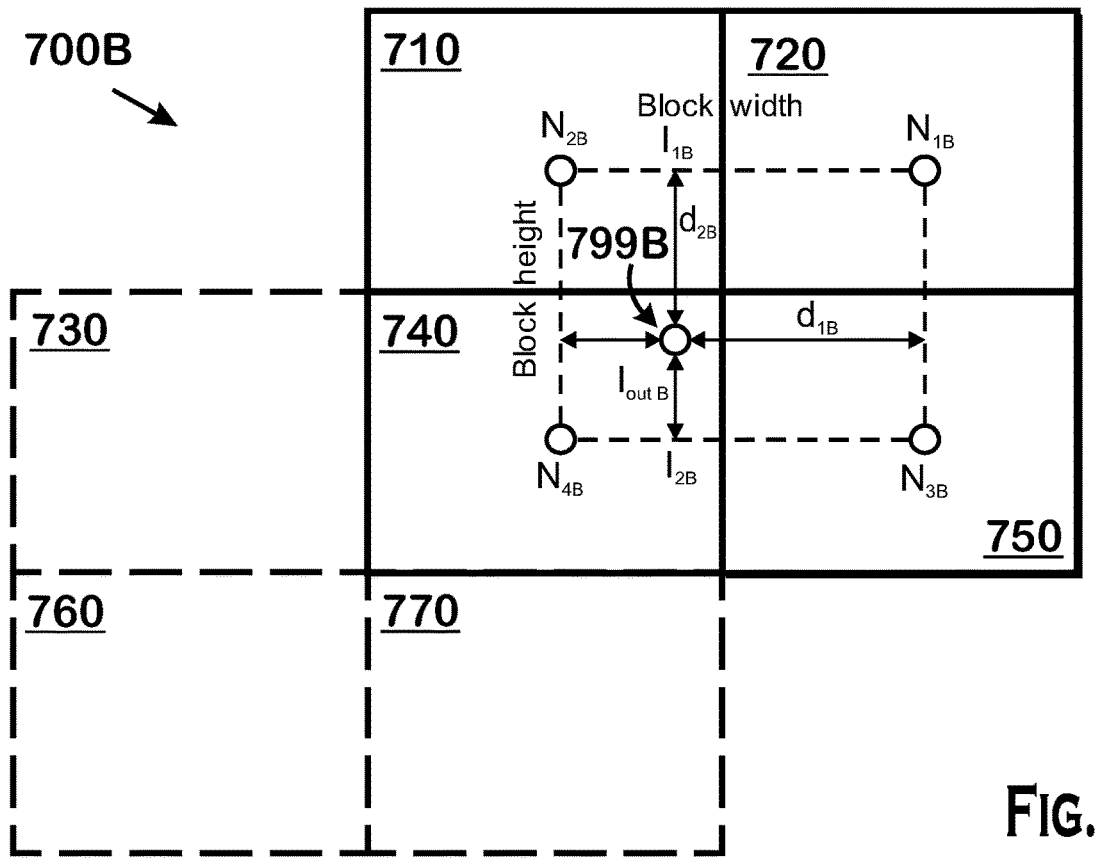
FIG. 7B is a diagram depicting another example of overlapped curve mapping.

FIG. 6 is a flow diagram depicting an example method 600 for performing overlapped curve mapping. At 610, for a target pixel, overlap blocks are determined. In some examples, overlap blocks are those blocks located closest to the target pixel. For example, for a given target pixel, four overlap blocks are determined. One of the overlap blocks is the block in which the target pixel is located. The other three overlap blocks are based on the quadrant of the block in which the target pixel is located. If target pixel is located in the lower left quadrant of its block, the other three blocks are the block to the left, the block below, and the block diagonally located to the left and below its block. If the target pixel is located in the upper left quadrant of its block, the other three blocks are the block above, the block to the left, and the block diagonally located to the left and above its block. If the target pixel is located in the upper right quadrant of its block, the other three blocks are the block above, the block to the right, and the block diagonally located to the right and above its block. If the target pixel is located in the lower right quadrant of its block, the other three blocks are the block below, the block to the right, and the block diagonally located to the right and below its block. FIGS. 7A and 7B provide an illustration of this concept.

At 620, the respective block mapping curves of the determined overlap blocks are applied to the input pixel value to generate corresponding intermediate pixel values for each respective applied overlap block mapping curve. At 630, corresponding weights are determined, based on a pixel location of the input pixel, for each respective intermediate pixel values output from the respective overlap block mapping curves applied to the input pixel value. At 640, an output pixel value is generated based on the corresponding weights and intermediate values. In some examples, bilinear interpolation of the intermediate pixel values generated in 620 is performed using the weights determined in 630 to generate the output pixel value in 640.

FIGS. 7A and 7B are diagrams 700A and 700B, respectively, depicting examples of overlapped curve mapping. In FIG. 7A, for a selected pixel 799A, blocks 730, 740, 760, and 770 are selected as overlap blocks. In FIG. 7B, for a selected pixel 799B, blocks 710, 720, 740, and 750 are selected as overlap blocks. In connection with 610 in FIG. 6, the aforementioned overlap blocks are determined for the corresponding selected pixel. As described above, the position of the selected pixel relative to the surrounding blocks is used to determine the overlap blocks. In some examples, such as those depicted in FIGS. 7A and 7B, the overlap blocks are selected based on the closest four blocks to the selected pixel. In FIG. 7A, blocks 730, 740, 760, and 770 are the closest 4 blocks to selected pixel 799A. In FIG. 7B, blocks 710, 720, 740, and 750 are the closest 4 blocks to selected pixel 799B. In some examples, the selected overlap blocks can be determined based on a distance between the selected pixel and the respective center of candidate blocks.

Figure 8:
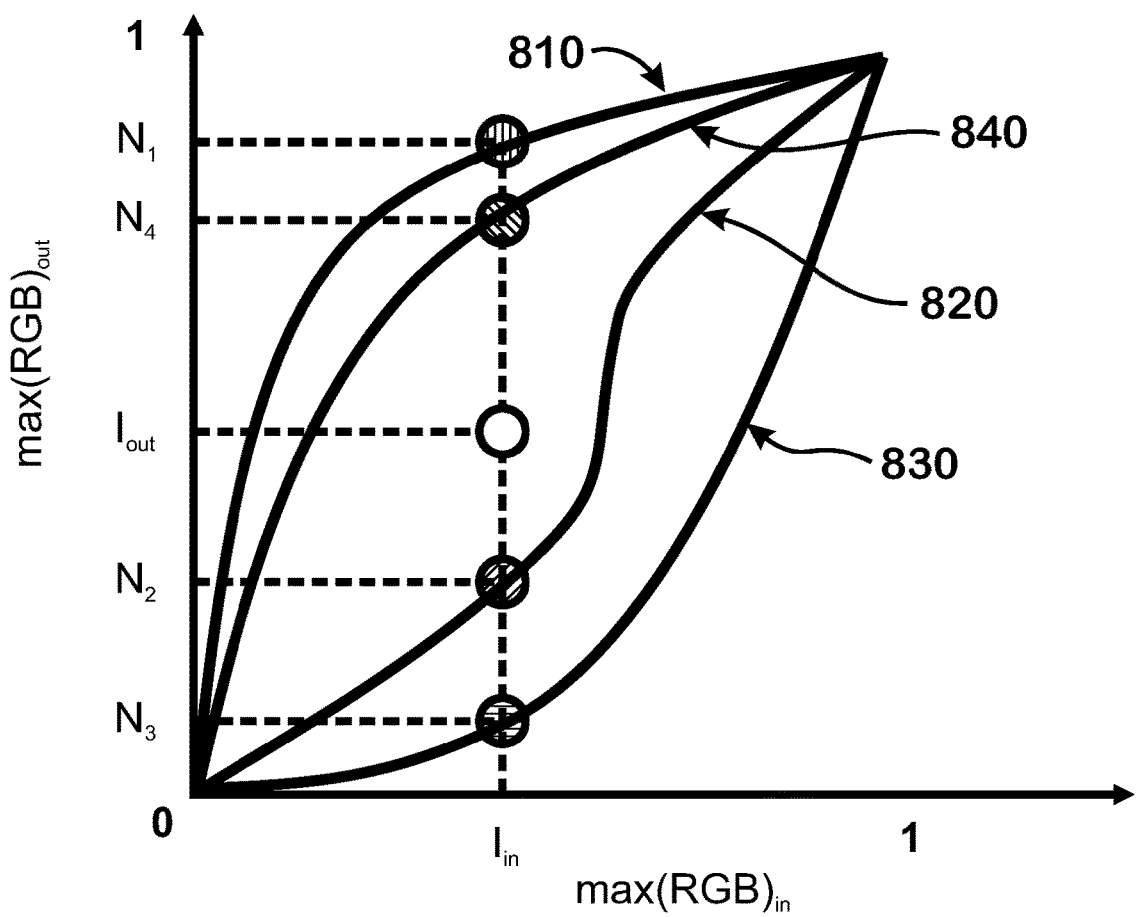
FIG. 8 is a pair of diagrams that depict another example of overlapped curve mapping.
Figure 8:
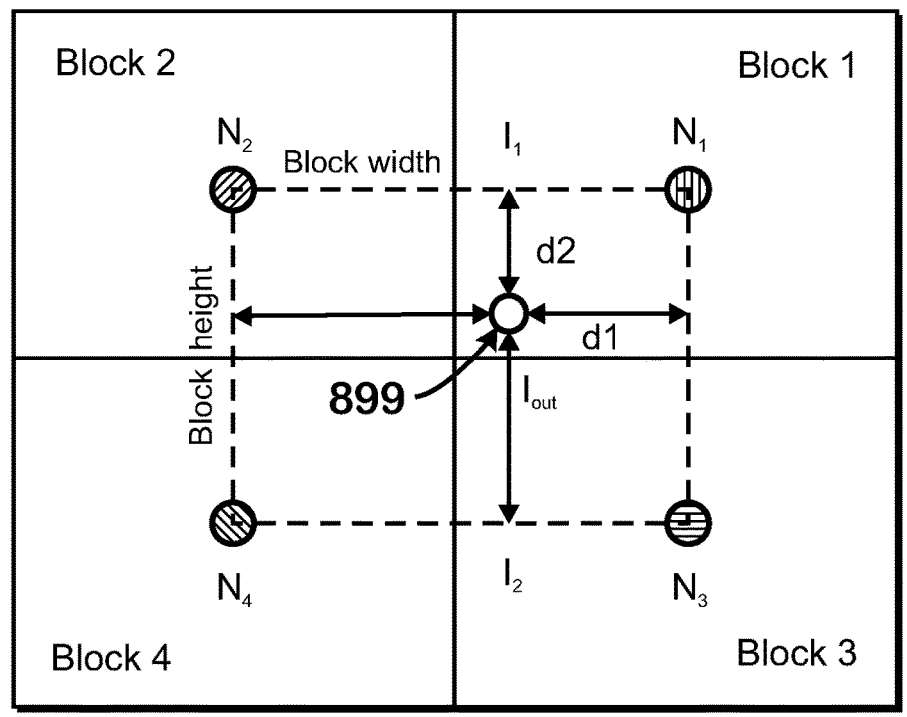

The values $N_{1A}$, $N_{2A}$, $N_{3A}$, and $N_{4A}$ depicted in FIG. 7A are the mapped intermediate values resulting from applying block mapping curves for blocks 740, 730, 770, and 760, respectively, to the input value for pixel 799A. Examples of block mapping curves are shown in FIG. 8. The values $N_{1B}$, $N_{2B}$, $N_{3B}$, and $N_{4B}$ depicted in FIG. 7B are the mapped intermediate values resulting from applying block mapping curves for blocks 720, 710, 750, and 740, respectively, to the input value for pixel 799B. In connection with FIG. 6, the aforementioned intermediate values are, for example, generated at 620. As described in more detail above, in some examples, at least some of the block mapping curves are a low-pass filtered version of an input block mapping curve for a block and some of its surrounding blocks.

In FIGS. 7A and 7B, Block width represents the width of a block, which also corresponds to a horizontal distance between the centers of two horizontally adjacent blocks, such as blocks 730 and 740. In FIG. 7B, Block height represents the height of a block, which also corresponds to a vertical distance between the centers of two vertically adjacent blocks, such as blocks 730 and 760. In FIG. 7A, $d_{1A}$ represents a horizontal distance from selected pixel 799A to a center of blocks 740 and 770. $d_{2A}$ represents a vertical distance from selected pixel 799A to a center of blocks 730 and 740. A horizontal distance from selected pixel 799A to a center of blocks 730 and 760 is thus equal to Block width−$d_{1A}$. A vertical distance from selected pixel 799A to a center of blocks 760 and 770 is thus equal to Block height−$d_{2A}$. In FIG. 7B, $d_{1B}$ represents a horizontal distance from selected pixel 799B to a center of blocks 720 and 750. $d_{2B}$ represents a vertical distance from selected pixel 799B to a center of blocks 710 and 720. A horizontal distance from selected pixel 799B to a center of blocks 710 and 720 is thus equal to Block width−$d_{1B}$. A vertical distance from selected pixel 799B to a center of blocks 740 and 750 is thus equal to Block height−$d_{2B}$.

In some examples, the distances $d_{1A}$ and $d_{2A}$ in FIG. 7A are used to weight values $N_{1A}$, $N_{2A}$, $N_{3A}$, $N_{4A}$ and the distances $d_{1B}$ and $d_{2B}$ in FIG. 7B are used to weight values $N_{1B}$, $N_{2B}$, $N_{3B}$, $N_{4B}$. In connection with FIG. 6, the distances can be determined, for example, to be applied to each of the intermediate values N at 630.

In some examples, bilinear interpolation is performed to apply weights to the intermediate N values. In one example of bilinear interpolation:

$$I_1 = \frac{N_1 \times (\text{Block width} - d_1) + (N_2 \times d_1)}{\text{Block width}}, \quad (2)$$

$$I_2 = \frac{N_3 \times (\text{Block width} - d_1) + (N_4 \times d_1)}{\text{Block width}}, \quad (3)$$

$$I_{out} = \frac{I_1 \times (\text{Block height} - d_2) + (I_2 \times d_2)}{\text{Block height}}, \quad (4)$$

where, $I_{in}$ is the input pixel value, and where Ratio=$I_{out}/I_{in}$.

It is mathematically equivalent to alternatively structure equations (2)-(4) as follows:

$$I_1 = \frac{N_1 \times (\text{Block height} - d_2) + (N_3 \times d_2)}{\text{Block height}}, \quad (5)$$

$$I_2 = \frac{N_2 \times (\text{Block height} - d_2) + (N_4 \times d_2)}{\text{Block height}}, \text{ and} \quad (6)$$

$$I_{out} = \frac{I_1 \times (\text{Block width} - d_1) + (I_2 \times d_1)}{\text{Block width}}. \quad (7)$$

As described above, the input pixel value can be the pixel's luminance, red channel, green channel, blue channel, maximum of the red, blue, or green channels, or any combination thereof. In one example, $I_{in}=a*Y_{in}+(1-a)*\max(R_{in}, G_{in}, B_{in})$. As explained above, a larger "a" value will generally result in more color shift due to an oversaturation of one or more color channel values. In this example for $I_{in}$, histograms for each block count bins of a corresponding $I_{in}$ for each pixel, and thus their corresponding block mapping curves are also a function of this $I_{in}$. For input RGB channel values of pixel 799A in FIG. 7A of $R_{inA}$, $G_{inA}$, and $B_{inA}$, the output pixel values for selected pixel 799A are:

$$R_{outA}=\text{Ratio}*R_{inA}, \quad (8)$$

$$G_{outA}=\text{Ratio}*G_{inA}, \text{ and} \quad (9)$$

$$B_{outA}=\text{Ratio}*B_{inA}. \quad (10)$$

For input RGB channel values for pixel 799B in FIG. 7B of $R_{inB}$, $G_{inB}$, and $B_{inB}$, the output pixel values for selected pixel 799B are:

$$R_{outB}=\text{Ratio}*R_{inB}, \quad (11)$$

$$G_{outB}=\text{Ratio}*G_{inB}, \text{ and} \quad (12)$$

$$B_{outB}=\text{Ratio}*B_{inB}. \quad (13)$$

In connection with FIG. 6, the RGB values for the output pixel as listed above are generated at 640. The pixel values for each pixel can be similarly scaled by using their respective horizontal and vertical distances relative to the surrounding blocks to map the input pixel values to new output pixel values. By performing overlapped curve mapping in accordance with the description above, blockiness and halo effects are mitigated. In some examples, spatial low-pass filtering of the block mapping curves is performed before the overlapped curve mapping.

FIG. 8 is a pair of diagrams that depict another example of overlapped curve mapping. In this example, max(RGB) for each pixel in each block is counted to generate the corresponding histograms and thus generate the associated block mapping curves. Thus, the block mapping curves 810, 820, 830, and 840 map an input max(RGB) for a pixel to an output max(RGB). As explained above, although the depicted block mapping curves map an input max(RGB) to an output max(RGB), other pixel values or functions of pixel values, for example pixel luminance or a function of pixel luminance, can be used. Block mapping curve 810 is the block mapping curve for Block 1. Block mapping curve 820 is an example of a block mapping curve for Block 2. Block mapping curve 830 is an example of a block mapping curve for Block 3. Block mapping curve 840 is an example of a block mapping curve for Block 4. In this example, $I_{in}$ is the input max(RGB) for selected pixel 899. $N_1$ is the mapped intermediate value for Block 1 based on its block mapping curve 810. $N_2$ is the mapped intermediate value for Block 2 based on its block mapping curve 820. $N_3$ is the mapped intermediate value for Block 3 based on its block mapping curve 830. $N_4$ is the mapped intermediate value for Block 4 based on its block mapping curve 840. Referring to, for example, the equations for bilinear interpolation (2)-(4), then $I_{out}$ and Ratio=$I_{out}/I_{in}$ can be determined to then generate output tone mapped and/or contrast enhanced output RGB values for pixel 899. For input RGB values for pixel 899 of $R_{in}$, $G_{in}$, and $B_{in}$, the output RGB values are then $R_{out}$=Ratio*$R_{in}$, $G_{out}$=Ratio*$G_{in}$, and $B_{out}$=Ratio*$B_{in}$.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, the ISP 300A and the ISP 330B may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A non-transitory computer readable storage medium storing computer code thereon for execution by at least one processor, the computer code comprising:
   instructions to divide at least a portion of an input image into a plurality of blocks of pixels;
   instructions to select an input pixel within the plurality of blocks of pixels, wherein the input pixel has an input pixel value and a pixel location;
   instructions to determine, from the plurality of blocks of pixels, a set of overlap blocks based on the pixel location, wherein the plurality of pixel blocks include at least three blocks of pixels in a vertical direction and at least three blocks of pixels in a horizontal direction; and
   instructions to generate a new pixel value for the input pixel based on a spatially low-pass filtered block mapping curve, wherein the spatially low-pass filtered block mapping curve is a function of the respective initial block mapping curve for each overlap block of the set of overlap blocks and the pixel location, wherein the new pixel value is based on a blended combination of:
      a red channel value, a green channel value, and a blue channel value of the input pixel value that are scaled based on a maximum value of the red channel value, the green channel value, and the blue channel value, and
      a luminance value of the input pixel value.

2. The non-transitory computer readable storage medium of claim 1, wherein the input pixel is located within a first block of pixels and the computer code further comprises:
   instructions to select a different pixel within the first block of pixels, the different pixel having a different location than the input pixel; and
   instructions to generate a new pixel value for the different pixel based on a different spatially low-pass filtered block mapping curve for the first block of pixels, wherein the different spatially low-pass filtered block mapping curve is a function of the respective initial block mapping curves for each overlap block of the set of overlap blocks and the different location.

3. The non-transitory computer readable storage medium of claim 1, wherein the computer code further comprises:
   instructions to generate the new pixel value using distances that are based on relative positions of the input pixel and each of the overlap blocks.

4. The non-transitory computer readable storage medium of claim 3, wherein an initial block mapping curve of a first overlap block with a center that is relatively closer to the input pixel than a second overlap block of the set of overlap blocks contributes relatively more to the new pixel value than an initial block mapping curve of the second overlap block.

5. The non-transitory computer readable storage medium of claim 1, wherein the computer code further comprises:
instructions to generate the spatially low-pass filtered block mapping curve based on a weighted average of the respective initial block mapping curves for each overlap block of the set of overlap blocks.

6. The non-transitory computer readable storage medium of claim 1, wherein the computer code further comprises:
instructions to send the new pixel value to a display device; and
instructions to display a pixel having the new pixel value on the display device.

7. A method of image signal processing, the method comprising:
dividing at least a portion of an input image into a plurality of blocks of pixels;
selecting an input pixel within the plurality of blocks of pixels, wherein the input pixel has an input pixel value and a pixel location;
generating a respective initial block mapping curve for each block of the plurality of blocks;
determining, from the plurality of blocks of pixels, a set of overlap blocks based on the pixel location, wherein the plurality of pixel blocks include at least three blocks of pixels in a vertical direction and at least three blocks of pixels in a horizontal direction; and
generating a new pixel value for the input pixel based on a spatially low-pass filtered block mapping curve, wherein the spatially low-pass filtered block mapping curve is a function of the respective initial block mapping curve for each overlap block of the set of overlap blocks and the pixel location, wherein the new pixel value is based on a blended combination of:
a red channel value, a green channel value, and a blue channel value of the input pixel value that are scaled based on a maximum value of the red channel value, the green channel value, and the blue channel value, and
a luminance value of the input pixel value.

8. The method of claim 7, wherein the input pixel is located within a first block of pixels and the method further comprises:
selecting a different pixel within the first block of pixels, the different pixel having a different location than the input pixel; and
generating a new pixel value for the different pixel based on a different spatially low-pass filtered block mapping curve for the first block of pixels, wherein the different spatially low-pass filtered block mapping curve is a function of the respective initial block mapping curves for each overlap block of the set of overlap blocks and the different location.

9. The method of claim 7, further comprising:
generating the new pixel value using distances that are based on relative positions of the input pixel and each of the overlap blocks.

10. The method of claim 9, wherein an initial block mapping curve of a first overlap block with a center that is relatively closer to the input pixel than a second overlap block of the set of overlap blocks contributes relatively more to the new pixel value than an initial block mapping curve of the second overlap block.

11. The method of claim 7, further comprising:
generating the spatially low-pass filtered block mapping curve based on a weighted average of the respective initial block mapping curves for each overlap block of the set of overlap blocks.

12. The method of claim 7, further comprising:
sending the new pixel value to a memory device; and
storing the new pixel value on a storage device.

13. A computer system comprising:
an image signal processor, the image signal processor configured to:
divide at least a portion of an input image into a plurality of blocks of pixels;
select an input pixel within the plurality of blocks of pixels, wherein the input pixel has an input pixel value and a pixel location;
generate a respective initial block mapping curve for each block of the plurality of blocks;
determine, from the plurality of blocks of pixels, a set of overlap blocks based on the pixel location, wherein the plurality of pixel blocks include at least three blocks of pixels in a vertical direction and at least three blocks of pixels in a horizontal direction; and
generate a new pixel value for the input pixel based on a spatially low-pass filtered block mapping curve, wherein the spatially low-pass filtered block mapping curve is a function of the respective initial block mapping curve for each overlap block of the set of overlap blocks and the pixel location, wherein the new pixel value is based on a blended combination of:
a red channel value, a green channel value, and a blue channel value of the input pixel value that are scaled based on a maximum value of the red channel value, the green channel value, and the blue channel value, and
a luminance value of the input pixel value.

14. The computer system of claim 13, wherein the input pixel is located within a first block of pixels and the image signal processor is further configured to:
select a different pixel within the first block of pixels, the different pixel having a different location than the input pixel; and
generate a new pixel value for the different pixel based on a different spatially low-pass filtered block mapping curve for the first block of pixels, wherein the different spatially low-pass filtered block mapping curve is a function of the respective initial block mapping curves for each overlap block of the set of overlap blocks and the different location.

15. The computer system of claim 13, wherein the image signal processor is further configured to:
generate the new pixel value using distances that are based on relative positions of the input pixel and each of the overlap blocks.

16. The computer system of claim 15, wherein an initial block mapping curve of a first overlap block with a center that is relatively closer to the input pixel than a second overlap block of the set of overlap blocks contributes relatively more to the new pixel value than an initial block mapping curve of the second overlap block.

17. The computer system of claim 13, wherein the image signal processor is further configured to:
   generate the spatially low-pass filtered block mapping curve based on a weighted average of the respective initial block mapping curves for each overlap block of the set of overlap blocks.

18. The computer system of claim 13, further comprising:
   a display device;
   wherein the image signal processor is further configured to send the new pixel value to the display device; and
   wherein the display device is configured to display a pixel having the new pixel value.

\* \* \* \* \*